Feb. 18, 1941.  K. A. HARMON ET AL  2,232,451
MAGNETO
Filed July 27, 1938　　2 Sheets-Sheet 1
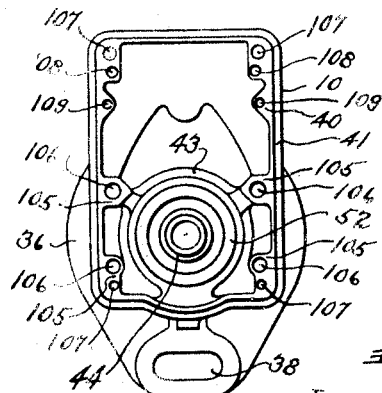
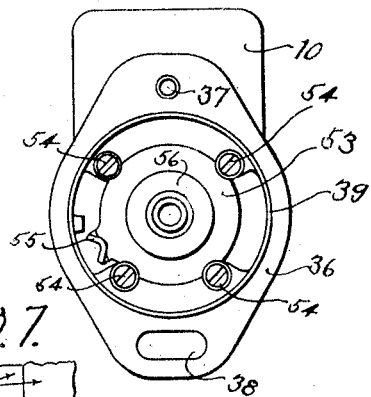
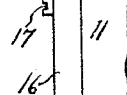
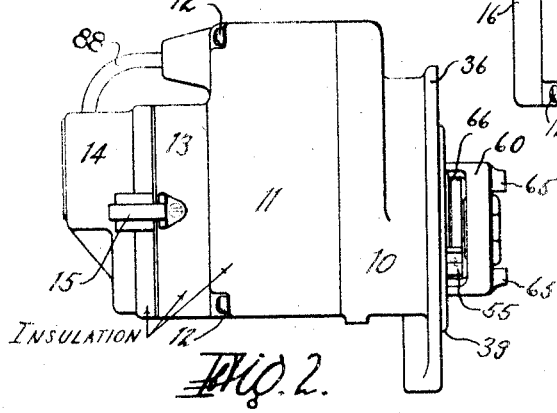
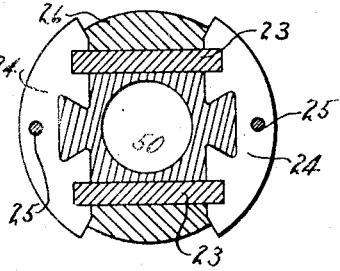
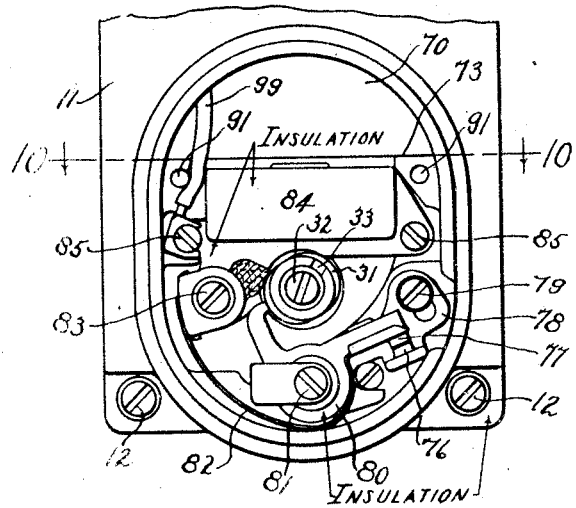
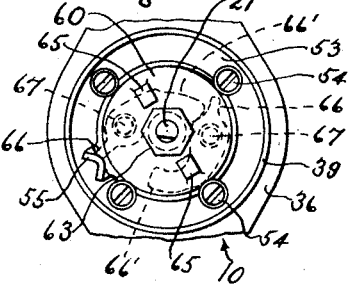
INVENTOR
KENNETH A. HARMON
BY AND RALPH W. CROCKER
Chapin + Neal
ATTORNEYS

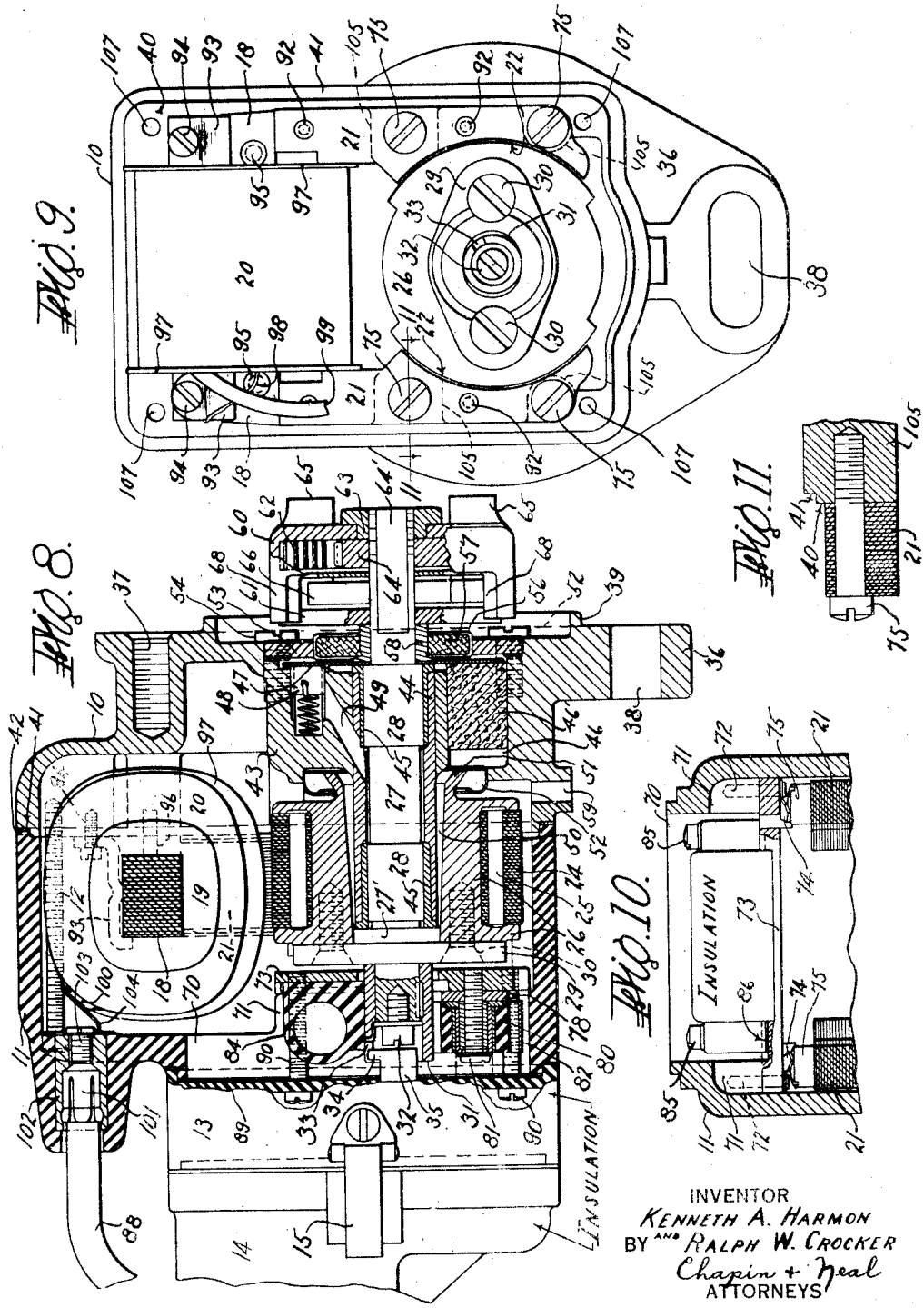

Patented Feb. 18, 1941

2,232,451

UNITED STATES PATENT OFFICE

2,232,451

MAGNETO

Kenneth A. Harmon, Longmeadow, and Ralph W. Crocker, West Springfield, Mass., assignors to Wico Electric Company, West Springfield, Mass., a corporation of Massachusetts

Application July 27, 1938, Serial No. 221,510

2 Claims. (Cl. 171—209)

This invention relates to improvements in magnetos.

The invention has for an object the provision in a magneto of an improved housing structure, made up of two mating box-like members which together form a housing for the essential working parts of the magneto,—such as the stator, rotor, coils and breaker point mechanism. One of said members has provisions for mounting it on an engine and serves as a frame on which are mounted all elements of the stator and all the bearings for all moving parts of the magneto. The other of said members serves as a removable cover and also carries the breaker point mechanism. The two housing members are separable along a parting surface such that the laminations of the stator are completely exposed when the cover member is removed, and project beyond the frame member in position for finishing, as by grinding, for example. With this arrangement an inexpensive but effective mounting of the laminated stator members may be utilized,—the various elements being clamped to the frame by screws,—and after these members have been thus clamped, they may be ground to provide surfaces in true concentricity with the rotor, all the bearings for which are also in the same frame. Also, the tops of the two laminated side members of the stator are wholly exposed so that they may be accurately machined, as by grinding, for a close fit with the coil-carrying core of the stator which rests thereon.

The invention also has for an object to provide a housing for the stator, rotor, coils and breaker point mechanism, whereby the same are completely enclosed, one member of the housing carrying all elements of the breaker point mechanism, except its actuating cam, and having a removable cover to afford access to such mechanism, the other member of the housing affording a frame to which are clamped the laminated-iron stator members one of which carries the coils, and from which all moving parts such as the rotor and breaker point actuating cam are rotatably supported,—said members, coils, rotor and cam being completely exposed on one face of the frame and accessible on removal of the other housing member,—the rotor shaft extending beyond the opposite face of the frame with a suitable coupling element for connection to an engine driven shaft.

A further object of the invention is to provide in a magneto of the type described, an impulse coupling as a driving connection between the rotor shaft and the engine shaft, said coupling being also wholly supported from the rotor shaft and thus from the one frame which supports all other moving parts.

A further object of the invention is to provide in the exposed outer face of the frame member a recess surrounding the rotor and serving to house lubricating means for the rotor bearings and a closure plate for said recess mounted on said face and capable of angular adjustment, said plate carrying the abutment for cooperation with the pawls of the impulse coupling.

These and other objects will be best understood as the detailed description proceeds and they will be particularly pointed out in the appended claims.

The invention will be disclosed with reference to the accompanying drawings, in which:

Fig. 1 is an exterior side elevational view of a magneto embodying the invention;

Fig. 2 is a fragmentary view taken from the left hand end of Fig. 1 with the distributer casing removed to show the interrupter mechanism;

Fig. 3 is a fragmentary view taken from the right hand end of Fig. 1 and showing the driving connections, including an impulse coupling;

Figs. 4 and 5 are front and rear elevational views, respectively, of the frame member of the magneto, shown separately as such, except in the case of Fig. 5 where a closure plate which also carries the stop for the impulse coupling is shown;

Fig. 6 is a cross sectional view of the magnetic rotor;

Fig. 7 is a fragmentary view taken similarly to Fig. 1 and showing a modification in the casing of the magneto;

Fig. 8 is a full size view, taken from the same direction as Fig. 1 and showing all of the magneto, except for the distributer and part of the impulse coupling, in central longitudinal section;

Fig. 9 is an elevational view taken from the left hand end of Fig. 1 and showing the magneto as it appears after the various removable casings have been removed;

Fig. 10 is a fragmentary sectional plan view taken on the line 10—10 of Fig. 2; and Fig. 11 is a sectional view taken on the line 11—11 of Fig. 9.

Referring to Fig. 1 of these drawings; the magneto includes a frame member 10 of non-magnetic metal, desirably formed by die-casting and on which the stator, coils, rotor and drive shaft of the magneto are mounted; a hollow casing 11 which may be of Bakelite and is secured by screws 12 to frame 10 and which cooperates with this frame to provide an enclosure for the parts supported on the frame and which carries within it the interrupter mechanism; and a distributer having two casing sections 13 and 14 held together in the conventional manner by spring clips 15,—the inner casing 13 being fixed as later described to casing 11. In the event that a distributer is not required, the casings 13 and 14 are replaced by a cover 16 (Fig. 7), secured to casing 11 by screws 17 and closing the opening in casing 11 through which access is had to the interrupter mechanism as will later appear.

The stator of the magneto (see Figs. 8 and 9) comprises a laminated iron core 18, primary and secondary coils 19 and 20, respectively, mounted on core 18, and a pair of laminated iron extensions or side members 21, which are connected one to each end of core 18 and extend downwardly therefrom in parallel relation, having on their inner and confronting faces partly cylindrical surfaces 22 which cooperate with the pole shoes of the rotor.

The rotor of the magneto (Fig. 6) comprises two short bar magnets 23 of high coercive force, mounted in laterally spaced, parallel relation, and two laminated iron pole shoes 24. The polar ends of the magnets are inset into the pole shoes as shown,—like polar ends of both magnets being connected to the same pole shoe. The laminations of each shoe are preliminarily held together in any suitable way, as by rivets 25. Both shoes and magnets are permanently held together by a body 26 of non-magnetic metal cast around them and engaging opposite ends thereof, as shown in Fig. 8.

The drive shaft of the magneto (Fig. 8), designated 27, has two longitudinally spaced journals 28 and a flange 29 which is secured by screws 30 to the outer end face of the rotor. Shaft 27 also extends to the left of the flange to carry a two-lobed cam 31 (Figs. 2 and 9) for operating the interrupter. Shaft 27 also extends to the right of the right hand journal 28 for coupling engagement with some suitable engine driven shaft. The cam 31 has a bore to receive the outer end of shaft 27 and is keyed thereto, as indicated. The outer end of such bore is counterbored to receive a cap screw 32 which is threaded into an end of shaft 27 and the head of which bears against the shoulder formed at the base of the counterbored portion and clamps the cam against flange 29. Cam 31 has an open-ended slot 33 therein to receive the crank-like projection 34 of the distributer shaft 35.

The frame member 10 (Figs. 8 and 9) is die-cast in roughly the form of an open rectangular box with such extensions therefrom as may be necessary in each particular case to provide for mounting it on the engine which is to drive the magneto and for which the magneto is to supply ignition. In this case, the magneto is provided with a crankcase mounting but it is to be understood that other forms of mounting may be provided, as may be necessary or desired. For the crankcase mounting, the rear and closed face of the box-like member 10 is extended to form a flange 36 (see also Fig. 5) with holes 37 and 38 to receive retaining screws. As shown in Fig. 8, hole 37 is threaded to receive the threaded end of a retaining screw, while hole 38 is unthreaded and preferably elongated to receive the screw which is adapted to thread into the crankcase. A circular pilot flange 39 (Figs. 5 and 8) is provided to closely fit the opening in the engine crankcase and centralize the drive shaft 27 with the engine shaft to which it is adapted to be coupled.

The box-like frame 10 has a smooth flat face 40 embordering its open end and is marginally recessed outside said face, as at 41, to receive the projecting rim 42 which emborders the open end of casing 11 (Fig. 8). Within the lower part of the hollow box-like frame 10, a hollow hub 43 is formed and fixed in and projecting forwardly from this hub through and beyond the open face of the box-like frame is a hollow stud 44, provided interiorly with bearings 45 to receive the journals 28 of the magneto drive shaft.

Within the lower part of hollow hub 43 is a reservoir 46 for lubricant and fixed to shaft 27, just beyond the right hand journal 28, is an elevator disc 47 of thin metal which conveys lubricant from the reservoir. Above the shaft, the hub 43 is recessed to receive a spring-pressed scraper 48 which bears against disc 47 and removes lubricant therefrom,—such lubricant passing by gravity through a passage 49 formed partly in hub 43 and partly in stud 44, into the interior of the hollow stud at a point between the journals 28. The lubricant flows in opposite directions along the shaft to lubricate both journals and bearings. Lubricant also passes from the left hand end of the left hand journal 28 radially outward between the flanged outer face of such journal and the adjacent end face of a flange 27' on shaft 27,—such faces cooperating as a thrust bearing. Lubricant passing this thrust bearing is forced to travel back in the space between the exterior of stud 44 and the wall of the central hole 50 in the rotor. The inner end face of the rotor is formed as an oil slinger 51, operating by centrifugal force to throw oil outwardly into an oil catching ring 52 fixed in the hub 43. This ring, at its lower portion, opens into the reservoir 46. It is preferred to have the lubricant, such as oil, contained within an absorbent material such as felt 46' which fills the reservoir.

The outer end of the hollow hub 43, which would otherwise be open, is closed by a circular plate 53, set into a recess in flange 36 and held in place by the heads of four screws 54, threaded into the flange. The heads of these screws partially overlap plate 53 (Fig. 5). By loosening these screws, the plate can be rotated for the purpose of adjusting a stop 55, fixed on the plate and adapted for cooperation with the pawls of the impulse coupling. Into the central part of plate 53 is set a casing 56 of thin metal, containing packing 57 which engages the hub of a member 58 fixed on shaft 27, and prevents escape of lubricant. This member 58 serves as an oil slinger, throwing outwardly any oil passing the right hand end of the right hand journal 28 of shaft 27, such oil being thrown back into reservoir 46. A hole 59 is provided in the bottom wall of member 10 to the left of hub 43, for the purpose of ventilating the interior of the enclosure formed by the member 10 and casing 11.

That portion of drive shaft 27 which projects to the right beyond plate 53 is provided with any appropriate means for coupling it to the engine shaft,—the particular means used being a matter of choice and depending on the circumstances of each particular case. As herein shown, an impulse coupling of well-known form is employed. This coupling includes driving and driven members 60 and 61, respectively, interconnected by a spiral spring 62 fixed at its ends one to each member. In this case, one end of the spring is bent over and engaged in a notch in member 60 and the other end, similarly formed, is engaged in a notch in a part 64. The part 64 is fixed to a flattened portion 64' of shaft 27. The driving member 60 is mounted to turn freely on a bushing 63 threaded on the outer end of shaft 27. This driving member has lugs 65 adapted for driving engagement with a coupling part on the engine shaft. The driven member 61 is fixed to the flattened portion 64' of shaft 27 and carries at diametrically opposite points two pawls 66 (Fig. 3), pivoted thereto at 67 and each having a weighted end 66'. On slow rotation of the driving shaft, these pawls will successively engage stop 55 and momentarily arrest the magneto shaft, while spring 62 is wound up by continued rotation of the driving shaft. One pawl is shown in this locking position in Fig. 3. On continued counterclockwise rotation of the driving member 60, one of the flanges 68 thereon will engage the pawl 66 and force it inwardly out of engagement with stop 55, allowing the previously wound up spring 62 to relieve its stress and drive the shaft 27 ahead at high speed.

The casing 11 carries all elements of the interrupter except the operating cam 31, already described. This casing, in addition to the substantially rectangular opening in its rear face, which opening is closed by frame 10, has a roughly elliptical opening 70 (Fig. 2) in its opposite and front face,—such opening being closed by the distributer casing 13 (Fig. 8) or alternatively by the cover 16 of Fig. 7, in case a distributer is not needed. Back of this opening and on opposite sides thereof are integral bosses 71 (Fig. 10) in which are embedded studs 72, one in each. A metal plate 73 bridges across the lower part of opening 70 with its ends overlapping and abutting the bosses 71. The studs 72 pass through plate 73, and through small flat springs 74, and are headed over to fix the plate 73 to casing 11 and the springs 74 to plate 73. When cover 11 is in place on frame 10, each spring contacts with a head of one of the cap screws 75 used to clamp the laminations 21 to frame 10. The springs 74 thus serve to ground plate 73 to the frame 10. As shown in Fig. 2, the interrupter elements are all mounted on the front face of plate 73 (Fig. 2). The breaker points are shown at 76 and 77. Breaker point 76 is mounted on a metal bracket 78 fixed in a manner to enable adjustment to plate 73 by screw 79 and in electrical connection therewith. The breaker point 77 is carried on one end of a lever 80 of insulating material, pivoted at 81 to plate 73 and having its other end riding on cam 31. A spring 82 serves to hold the lever 80 in engagement with cam 31 and also to electrically connect breaker point 77 to a terminal 83. This terminal is the insulated terminal of a condenser which is mounted within a molded casing 84 of insulating material. Casing 84 is secured by screws 85 to plate 73 and the right hand screw serves to clamp the ground terminal 86 of the condenser to plate 73 (see Fig. 10).

The distributer may be of any suitable construction and it is not deemed necessary to an understanding of the present invention to illustrate and describe in detail the distributer. It should suffice to state that its rotor drive shaft 35 is driven from shaft 27 by the crank pin 34 and that it is electrically connected to the magneto by the wire 88. The distributer casing 13 has a rear wall 89 and screws 90, passing through this wall thread into holes (shown at 91 in Fig. 2) on plate 73, thereby holding the casing 13 in place.

The lamination groups 21 are each firmly clamped to the finished face 40 of frame 10 by cap screws 75,—two such screws being provided for each group. These screws closely fit the holes in the members 21, just like locating dowel pins, and hold the members against lateral displacement independently of the clamping pressure of the screws. The laminations of each group are bound together prior to assembly on frame 10 by rivets 92. The core 18 rests upon the upper ends of members 21 and is clamped thereto by clips 93 and screws 94, which bind the clips to frame 10. The laminations of core 18 are also bound together, prior to assembly on members 21, by rivets 95. The core 18 does not directly abut surface 40 but is spaced therefrom by pins 96, fixed to member 10.

The coils 19 and 20 lie between the members 21 and also extend rearwardly into the recessed upper portion of frame 10. Separator discs 97 of insulating material are mounted on core 18, one at each end of the coils and serve to protect the ends of such coils from the adjacent members 21. One terminal of each coil 19 and 20 is grounded to frame 10. Such terminals are connected together and to a wire 98 which is fastened beneath one of the clips 93. The other terminal of the primary coil 19 is connected by a wire 99 which extends downwardly through hole 70 and over plate 73, and is connected to terminal 85. The other terminal of the secondary coil 20 terminates in a metal button 100. The wire 88 (Fig. 8) has a spring terminal 101, engaging in a metal socket 102, embedded in casing 11. Secured to the inner end of socket 102 by a screw 103 is a spring clip 104, which engages the button 100 to complete the electrical connection.

The invention affords substantial savings in manufacturing cost without in any way detracting from sturdiness of construction, effectiveness in operation and useful life of the magneto. An important saving results from the simple means employed for anchoring the stator elements, particularly the two side elements 21 of the inverted U-shaped structure. These side elements are frequently embedded in the frame during the casting process but this is costly and great care must be used to get them accurately located in the molds. Moreover, it has heretofore been necessary, where these elements have been embedded in the housing, to provide a removable top cover section in order to expose them enough to allow finishing of the surfaces on which the ends of core 18 rest. With the construction here shown, the laminations are bound together by the rivets 92 in the usual way and then located properly on frame 10 and clamped in place by the screws 75. Two screws, each having a close fit, like that of a locating dowel, in the holes in its member 21, serve both to locate and to clamp such member rigidly in place, preventing it from lateral displacement in any direction. These members 21 rest on the finished face 40 or, more particularly, on sections 105 (Fig. 4) thereof. These sections 105 are supporting pads of a width equal to the width of members 21 at the locations where the screws 75 are applied. The two pads 105 for each member 21 effectively support the member, preventing it from tilting. The pads 105 constitute the important parts of the finished face 40 and the rest of such face might even be omitted insofar as the supporting function is concerned. It will be clear that the elements 21, having been clamped in place on frame 10, may be finished simply but accurately so that the surfaces 22 are truly concentric with the bearings 45 for the rotor and so that the upper ends may be ground accurately to receive the ends of core 18.

All machining operations, except for the rotor and its shaft, are performed on the one frame member 10 and parts fixed thereto. All necessity for aligning bearings in separate parts is avoided by providing all the bearings in member 10. For example, the hollow stud 44 is first finished with a reamer. Then the casting is mounted on an arbor forced into the reamed stud, after which the face 40 and the corresponding faces of pads 105, which come smooth and flat as a result of the die casting process without requiring machining, is clamped against a face plate. Then all necessary boring and facing operations are done with this set-up. Then the casting is reversed on the arbor and face plate and the surfaces 22 machined. With a similar mounting of the casting the tops of laminations 21 are ground. This disposes of all machining operations except the drilling and tapping of holes 106, 107 and 108 for screws 75, 12 and 94, respectively, and the drilling of holes 109 for dowel pins 96. All this work is capable of being performed in quantities at low unit cost. By the construction described, close accuracy in the desired close fit between the rotor and stator elements 21 is insured. The widely spaced bearings 45 support the shaft so effectively that its overhanging portions, one carrying the interrupter cam and the other the impulse coupling run truly without eccentricity which, if present, would interfere with proper actuation of the interrupter.

The operation of the magneto is as usual, and being well understood in the art, need not be described herein, especially since the invention is more particularly concerned with the mechanical instead of the magnetic and electrical phases of the construction. For a full disclosure of the operation, reference is made to U. S. Patent No. 1,858,404 granted May 17, 1932, on an invention of T. G. Louis.

The invention affords a novel and desirable form of housing in which two box-like members fit together to provide a closure for all parts of the stator, the rotor, the coils and the interrupter. All are effectively enclosed within this two-part housing, yet by removing the few screws 12, the two housings may be separated. When the housings are thus separated, one carries all parts of the magneto, with the exception of the interrupter mechanism,—all such parts remaining in assembled and working relation yet wholly and easily accessible. The interrupter is carried by the other housing and is accessible by removing the cover, such as the member 16 of Fig. 7 or the casings 13—14 of Fig. 8.

What we claim is:

1. In a magneto, a frame member, a stator element supported from one face of said member, a hub on said face carrying bearings, a drive shaft mounted in said bearings and projecting beyond opposite ends of said hub, a rotor supported by one end of said shaft and on the same side of said member as said stator and cooperating therewith, said hub having a recess therein opening to the opposite face of said frame, means located in said recess for supplying lubricant to said bearings, a closure plate for said recess mounted on the last-named face of said frame for angular adjustment about the axis of said shaft, an impulse coupling on the other end of said shaft and adjacent said closure plate, and a fixed abutment carried by the closure plate and cooperating with the impulse coupling.

2. In a magneto, a frame of open-box form including a back wall and a marginal wall completely embordering the back wall and projecting from one face thereof, a drive shaft, means fixed in said back wall for rotatably supporting said shaft, said shaft extending away from said face and beyond said marginal wall, a rotor carried by said shaft and extending beyond the marginal wall, a stator including side members shaped for cooperation with the rotor and located on opposite sides thereof and extending in a plane at right angles to the axis of the rotor beyond the same and terminating with faced ends, said stator including a core resting at its ends one on each of said faced ends and coils on said core between the ends thereof and extending in part into the enclosure within said marginal wall, supporting pads formed on said frame and inside said marginal wall, means for clamping said side members to said pads and fixing each thereof to said wall independently of the other and independently of the supporting means for said shaft, means for clamping the core ends to the faced ends of said side members, said side members and cores located wholly outside said enclosure, and a cover member of open-box form having a marginal wall to mate with the first-named marginal wall, said cover and frame cooperating to provide a complete enclosure for the rotor and stator.

KENNETH A. HARMON.
RALPH W. CROCKER.